United States Patent [19]

van

[11] Patent Number: 4,909,456

[45] Date of Patent: Mar. 20, 1990

[54] DEVICE FOR ADJUSTING SAFETY BELT LENGTH

[75] Inventor: Reiner Van Riesen, Pinneberg, Fed. Rep. of Germany

[73] Assignee: Van Riesen & Co., Pinneberg, Fed. Rep. of Germany

[21] Appl. No.: 97,944

[22] Filed: Sep. 17, 1987

[30] Foreign Application Priority Data

Sep. 18, 1986 [DE] Fed. Rep. of Germany ....... 3631702

[51] Int. Cl.⁴ ...................... B60R 22/34; B65H 75/48
[52] U.S. Cl. ............................................. 242/107.4 R
[58] Field of Search ...................... 242/107.4 R, 107.6, 242/84.8, 107.1, 107.11, 107.12; 297/476, 478, 479

[56] References Cited

U.S. PATENT DOCUMENTS

| 1,415,489 | 5/1922 | Simpson | 242/107.6 |
| 3,224,706 | 12/1965 | Bastow | 242/107.6 |
| 3,325,212 | 6/1967 | Dillender | 242/107.4 R X |
| 4,226,385 | 10/1980 | Meiller et al. | 242/107.4 R |

FOREIGN PATENT DOCUMENTS

| 2104855 | 8/1971 | Fed. Rep. of Germany ... 242/107.4 R |
| 2356694 | 10/1975 | Fed. Rep. of Germany ......................... 242/107.11 |
| 1016223 | 1/1966 | United Kingdom ......... 242/107.4 R |

Primary Examiner—John M. Jillions
Attorney, Agent, or Firm—Balogh, Osann, Kramer, Dvorak, Genova & Traub

[57] ABSTRACT

A device for adjusting the belt length in a safety belt system comprises a frame and a winder element rotatably journalled thereon, from which the belt may be unreeled, upon actuation of a key, against the force of a spring and on to which it may be wound again automatically by the force of this spring. To ensure the immobilization of the belt at its required length, the winder element interengages with a lock releasable by the key.

2 Claims, 1 Drawing Sheet 4,909,456

DEVICE FOR ADJUSTING SAFETY BELT LENGTH

BACKGROUND OF THE INVENTION

The invention relates to a device for adjusting the belt length of a safety belt system, in which a winder element is rotatably installed on a frame, from which the belt may be unreeled upon actuating a key against the force of a spring and on to which it may be wound again automatically by the force of this spring.

DESCRIPTION OF THE PRIOR ART

An adjusting device of this nature is disclosed in German Utility Model 84 30 437. Although it has proved substantially satisfactory in practice, it may happen that the retaining force of the key is inadequate for secure retention of this belt in case of an unfavorable direction of pull on the belt which is to be unreeled and that the belt may not hold as required. It has been found furthermore that the key is not positioned in a favorably accessible manner so that the actuating hand must assume an awkward position in order to release the key. The construction of the device is also not as compact as it might be because of the design of the key as a "tumbler" element.

SUMMARY OF THE INVENTION

It is accordingly an object of the invention to provide a device of the kind referred to in the foregoing, in which the immobilization of the windable belt strap is assured in any case whilst the key is not operated. It is a further object of the invention to provide such a device in which the key is situated in an operationally favorable manner, and which device as such is of very compact construction.

These objects are achieved in accordance with the invention in that the winder element is arranged to interengage with a lock releasable by means of the key.

In a preferred embodiment of the device according to the invention the lock comprises a first denticulation providing engagement between the winder element and the key and a second denticulation providing engagement between the key and the frame, the first denticulation being disengageable upon operating the key connected to the frame in a non-rotatory manner by depressing the key, which is arranged in the area of one axial end of the winder element, and thus disengaging the denticulations. To this end, the winder element has a toothed axial extension at its free end, over which fits the key in a cap-like manner.

It is ensured b means of the invention that the length of the belt of a safety belt system is always retained once set so that accidental shifts of the belt are prevented. Furthermore, the key is so installed on the frame that it may be operated to work the lock with the hand in a favorable position, thereby facilitating the operation of the device. The key itself may moreover have very small dimensions, enabling the device as a whole to be constructed more compactly and with a lesser weight than hitherto.

Further objects and advantageous features of the invention will become apparent from the following detailed description taken in conjunction with the accompanying drawings which illustrate a preferred embodiment thereof.

DETAILED DESCRIPTION OF THE PREFERRED EMBODIMENT

Figure 1:
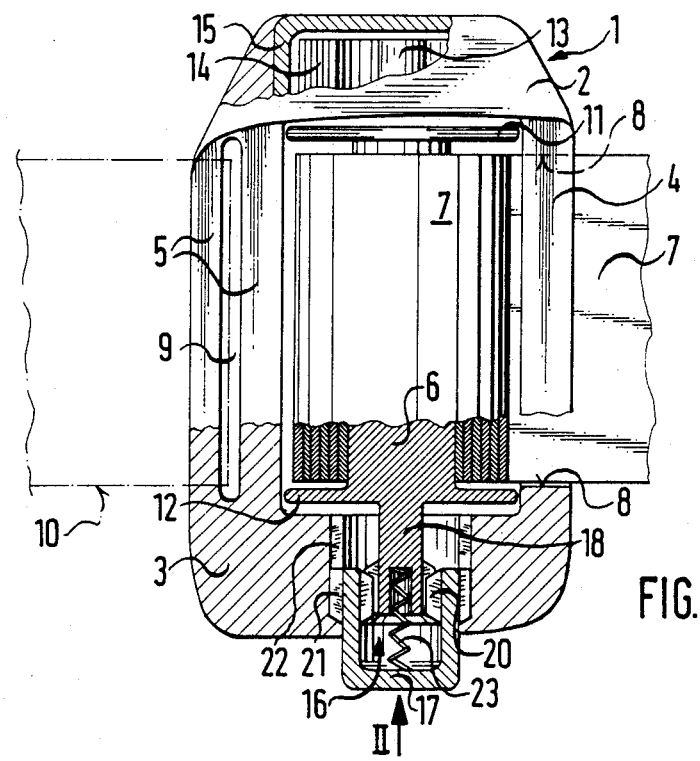
FIG. 1 shows a plan view, partly in section, of a safety belt winding mechanism in accordance with a preferred embodiment of the invention.
Figure 2:
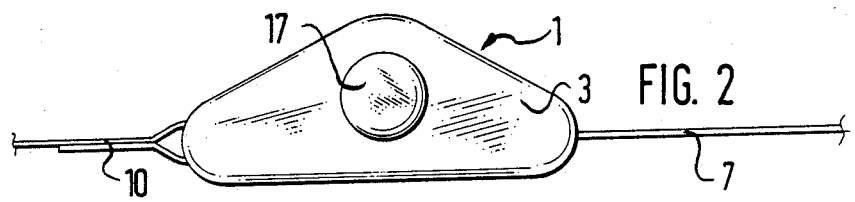
FIG. 2 shows a sideview in the direction of the arrow II in FIG. 1.

The embodiment of the invention shown in FIG. 1 comprises a frame 1 of substantially rectangular shape in plan view, which has two lateral and mutually opposed case sections 2 and 3 as well as two struts 4 and 5 interconnecting these sections, and a winder element 6 on which is secured a safety belt 7. Whereas one strut 4 is provided with a slot 8 traversable in the direction of pull of the belt 7 to guide the belt, the other strut 5 has a conventional slot 9 for securing another belt 10 which is commonly fixedly attached to the frame 1. The maximum wound length of the belt strap which is to be carried by the winder element 6 commonly amounts to about 20 to 35 cms. The winder element is an essentially cylindrical component which may be produced from plastics material or from light metal, and is rotatably journalled in the lateral case sections 2 and 3. It has two flanges 11 and 12 for laterally guiding the wound length of the belt 7.

At one end, the winder element 6 has a stud 13 engaging in the case section 2, which is acted upon in a known manner by a coil spring 14 which on the other hand is secured to the case section and establishes an initial loading on the winder element. A cap 15 forms the outer lateral delimitation of the case section and thereby covers the stud and the coil spring.

The other case section comprises a lock generally indicated by 16, which interengages with the winder element 6 as well as with a key 17 which for its part transmits the locking moment to the frame 1.

The key is preferably in the form of a cap and is provided on its inner cylindrical rim portion with engaging means at either side, which correspondingly co-operate by engagement with the case section 3 as well as with the winder element 6, and thus lock the winder element. To this end, the winder element 6 is provided at its free end with an axial extension 18 which for its part is provided on its free end with a radially toothed spur gear denticulation 19. As shown in FIG. 1, this denticulation 19 engages in a corresponding radially toothed spur gear denticulation 20 of the key 17 and together with this denticulation, forms a first, radially inner, pair of denticulations.

A second, radially outer pair of denticulations is provided between the cap-shaped key 17 and the case section 3 to exert a locking action on the winder element 6. To this end, the key is provided on its outer cylindrical side with another radially toothed spur gear denticulation 21 which engages in a radially toothed spur gear denticulation 22 of the case section 3, whereby the key is held against rotation relative to the case section, with which it engages. To make provision for satisfactory guiding of the key in the case section, its denticulation 22 preferably has an overall length which corresponds to the sum of the length of the denticulation 22 and the operating stroke of the key.

It is clear furthermore that the stroke of the key must be sufficiently long that its inward denticulation 20 may pass out of mesh with the denticulation 19 of the extension 18 of the winder element 6.

Instead of the outer pair of denticulations 21,22 it is also possible to make use of an engagement of the tongue and groove kind, in which connection it is appropriate to utilise two mutually opposed tongue and groove systems. Other sliding engagements are also possible at this point however, which ensure that the key 17 is coupled in non-rotatory but axially displaceable manner to the case section 3. The term "denticulation" utilised for this joint should be interpreted to include such engagements.

The key 17 is moreover arranged co-axially with respect to the extension 18 or rather the winder element 6 and is displaceable in the direction of the longitudinal axis of the winder element. The initial position of the key is maintained by means of a compression spring 23 which on the one hand is located in a central recess 24 of the extension 18 and on the other hand acts internally on the key. The key itself again bears against a stop shoulder 25 of the case section 3, that is to say with its outer denticulation 21.

Figure 3:
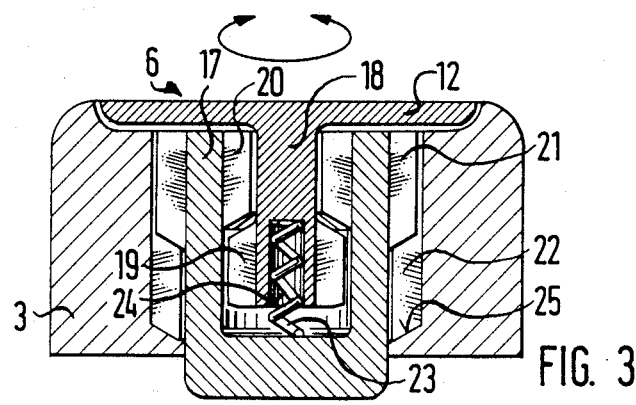
FIG. 3 shows an enlarged sectional view of part of the embodiment of FIG. 1, with the lock disengaged.

The device described in the foregoing operates as follows. If a length of the belt 7 is to be unreeled, the key 17 is pushed in so that the lock 16 is unlocked as apparent from FIG. 3. The winder element 6 is then freely rotatable and the required belt length may be pulled out against the force of the coil spring 14. Releasing the key causes relocking of the winder element (FIG. 1). If a length of the belt is to be retracted again, the key 17 is depressed again so that the coil spring 14 performs a winding action on the belt 7, whereupon the key is released again and thereby causes renewed locking of the lock 16.

What is claimed is:

1. A device for adjusting the effective length of a belt in a safety belt system, comprising a support frame, a winder element which receives a belt, spring means biasing said winder element in one rotational direction, locking means located at an end of said winder element, said winder element provided with an axial extension and a first part of a first denticulation which acts to prevent rotation of said winder element, key means provided with a second part of said first denticulation which engages said first part and which acts to release said locking means thereby allowing said winder element to receive the belt by winding in response to the action of said spring means, said key means forming a cap located at an end of said winder opposite said spring means and having an axially extending member forming circumferential radially inner and outer surfaces, said second part of said first denticulation being located along said inner circumferential surface of said key means, and in engagement with said first part of said first denticulation, said cap including a first part of a second denticulation disposed at the outer circumferential surface, parallel to said first denticulation and in engagement with a second part of said second denticulation which is disposed on said frame, said second denticulation preventing rotation of said cap relative to said frame, said cap being axially slidable relative to said frame to allow disengagement of said first denticulation and to release said winder element, said first parts of said first and second denticulations having radial teeth which mate with corresponding radial teeth on said second parts of said first and second denticulations.

2. A device for adjusting the effective length of a belt in a safety belt system as claimed in claim 1, comprising a second spring means which biases said cap into a rest position and urges said cap against a stop of said frame thereby effectively engaging said first denticulation with said winder, said second spring being disposed in a central recess of said extension.

* * * * *